United States Patent [19]
Durham

[11] Patent Number: 6,014,866
[45] Date of Patent: Jan. 18, 2000

[54] MULTIPLEX SYSTEM FOR MAINTAINING OF PRODUCT TEMPERATURE IN A VEHICULAR DISTRIBUTION PROCESS

[76] Inventor: James W. Durham, 1727 E. Saluda Lake Rd., Greenville, S.C. 29611

[21] Appl. No.: 08/847,833

[22] Filed: Apr. 17, 1997

[51] Int. Cl.[7] .............................. F25B 19/00; B60H 1/32
[52] U.S. Cl. ................................ 62/201; 62/239; 62/265
[58] Field of Search ............................ 62/299, 239, 435, 62/265, 201, 406; 165/42

[56] References Cited

U.S. PATENT DOCUMENTS

| | | | |
|---|---|---|---|
| 1,980,688 | 11/1934 | Lewis ...................................... | 62/435 X |
| 2,778,206 | 1/1957 | Wilson et al. .......................... | 62/239 X |
| 3,468,369 | 9/1969 | Tetrick et al. ......................... | 62/299 X |

FOREIGN PATENT DOCUMENTS

| | | | |
|---|---|---|---|
| 2757891 | 6/1979 | Germany ................................. | 62/249 |

*Primary Examiner*—William Wayner
*Attorney, Agent, or Firm*—Cort Flint

[57] ABSTRACT

A multiplex system is disclosed for maintaining the temperature of a product during a warehouse and distribution process employing a vehicle. The multiplex system may include a plurality of temperature control zones at which it is desired to maintain the temperature of the product. A cargo temperature control zone includes a parking area for a number of delivery vehicles having cargo containers. A primary refrigeration system is utilized to refrigerate a secondary fluid which is a non-compressible fluid that may be pumped over long distances to the cargo temperature control zone, as well as other temperature control zones. The secondary refrigerated fluid is pumped to an air handling unit which advantageously is disposed within the cargo container of one or more parked delivery vehicles. Preferably, at least two handling units are provided in each cargo container for more even distribution of refrigerated air. An expansion tank is provided inside the cargo container for accommodating the hydraulic expansion of secondary fluid in the event the inside temperature becomes elevated. A main supply and return line system connected a fluid distribution center to the temperature control zone which includes a reverse-return line. Auxiliary, flexible supply and return lines are connected to the main supply and return lines and include fluid couplings for quick connection to the cargo containers.

45 Claims, 9 Drawing Sheets

MULTIPLEX SYSTEM FOR MAINTAINING OF PRODUCT TEMPERATURE IN A VEHICULAR DISTRIBUTION PROCESS

BACKGROUND OF THE INVENTION

This invention relates to a system for refrigerating and/or heating products which are required to be maintained at a desired temperature during the distribution process to the public such as beer, milk, meats, and other products requiring temperature control. In particular, the invention relates to a multiplex warehousing system wherein certain areas needing cooling and/or heating in the distribution process of the product, such as a vehicle loading area and product storage areas are cooled and/or heated by an efficient and environmentally friendly system.

Heretofore, it has been known to distribute beer and other products using trucks which have a cargo container in which the product is carried during delivery. Sometimes the product is refrigerated and placed in the cargo container, and sometimes the vehicle includes a refrigeration system to maintain the temperature of the product. In either case, the product is often not maintained at the desired temperature either because the product and the cargo container cooling cannot be maintained. In particular, a product is often loaded on the vehicle the night before delivery and the vehicle is utilized in the hot sun the next day. The product is often delivered through the next day resulting in the temperature of the cargo container rising above the desired temperature. If product is left over and remains on the truck at the end of the day, it becomes labor intensive to unload the product and remove it to a refrigerated or heated facility.

Moreover, past systems have used a large number of sealed refrigerant refrigeration systems which require refilling and involve other problems which allow leakage of fluorocarbons into the atmosphere which is highly undesirable. In unrelated uses, it has been known to use a sealed refrigerant system with a compressible/expandable refrigerant to chill a glycol/water solution in ice skating rinks and the like wherein the chilled solution is utilized to maintain the frozen condition of the ice. U.S. Pat. No. 5,513,500 discloses the use of a similar concept in a system for cooling food on an airplane.

U.S. Pat. No. 5,548,967 discloses a method and apparatus for cooling and preserving fresh products in a box compartment, such as a vehicle trailer, by circulating brine from a refrigeration system through cooling circuits disposed in the walls of the box compartment. U.S. Pat. No. 4,553,584 discloses a conventional refrigeration system for a trailer truck.

While the above may be suitable for their intended applications, the prior art has not provided a satisfactory system for maintaining the temperature at a number of different temperature zones within a multiplex warehouse distribution system during a distribution process of a beverage or food product using delivery vehicles, particularly, a system for maintaining the temperature of the product in the cargo container of the vehicle while parked at the warehouse complex in a reliable and environmental friendly manner, and without the extensive need of labor to off load and reload the product to maintain the product temperature.

Accordingly, an object of the present invention is to provide a system which more efficiently and reliably maintains the temperature of product during the distribution process, particularly in the cargo container of a delivery vehicle.

Another object of the present invention is to provide a more environmental friendly temperature maintenance system for food and beverage products in the delivery process where the use of sealed fluorocarbon refrigerant units is reduced, particularly at a number of locations and units.

Still another object of the present invention is to provide a multiplex system wherein several areas that involve the cooling and/or heating of product and/or the delivery vehicle itself are carried out in an efficient manner using a central system which provides a more efficient and environmental friendly system.

SUMMARY OF THE INVENTION

The above objectives are accomplished according to the present invention by providing a system for maintaining the temperature of food and beverage products located at a plurality of remote temperature control zones within a distribution multiplex which includes a main refrigeration center connected in fluid communication to the temperature control zones. The refrigeration center includes a primary refrigeration unit which employs a compressible, primary refrigerant; and a source of a secondary fluid which is chilled by the primary refrigerant to provide a refrigerated secondary fluid. A fluid distribution center stores the secondary fluid and distributes the secondary fluid to the temperature control zones as needed. A plurality of main supply lines and main return lines are connected in fluid communication between the distribution center and the temperature control zones for supplying and returning the secondary fluid to the distribution center. A pump is connected in each of the main supply lines for selectively delivering the secondary fluid to one of the temperature control zones as the need requires to maintain a desired temperature at a corresponding temperature control zone. There is a cargo temperature control zone which includes a parking area, and a plurality of delivery vehicles having cargo containers in which the product is contained for delivery parked at the parking area. There is at least one air handling unit located at the cargo temperature control zone through which the secondary fluid passes in a heat exchange relationship with air to create a refrigerated air flow which is distributed into a cargo container of at least one vehicle for cooling the product. In an illustrated embodiment of the invention, an air handling unit is carried in the cargo container of each vehicle parked at the cargo temperature control zone. A plurality of flexible, auxiliary supply and return lines are connected to the main supply and return lines and are releasably coupled to the cargo containers for delivering the secondary fluid to the air handling unit within each cargo container. Preferably, each cargo container includes a first air handling unit disposed toward the front end of the cargo container and a second air handling unit disposed toward the rear end of the cargo container.

In another embodiment, the system may include an air handling unit located at the cargo temperature control zone outside of the cargo containers of the vehicles, and an air duct system arranged to receive the refrigerated air flow from the air handling unit and distribute the refrigerated air flow into one the cargo containers of one or more of the delivery vehicles. The air duct system comprises a manifold in fluid communication with the air handling unit, and a plurality of flexible air supply ducts connected to the manifold and releasably coupled to the cargo containers for delivering the refrigerated air flow into the cargo containers.

Heat reclamation may also be utilized in the systems to add heat to additional areas, or to produce hot water, or to heat the product rather than cooling. The system is designed primarily for the beer manufacturing, storage, and delivery industry, but may have other applications as well. The system is unique in that it will cool several different areas or zones at different temperatures in different locations, while only using one sealed fluorocarbon refrigeration unit. The system is environmentally friendly in that it uses up to 85% less fluorocarbons to accomplish the end results in refrigeration. Although the factory sealed and packaged primary unit does use fluorocarbon gas to do its work, the total refrigerant use of the present system is up to 85% less than the amount used in typical direct-expansion systems now in use for maintaining product temperature. The use of a single factory-sealed unit at a central location, together with a secondary non-sealed refrigerant system at remote locations, greatly diminishes the possibility of fluorocarbon gas escaping into the atmosphere. The primary refrigeration unit maintains the secondary fluid at a predetermined temperature setting. This temperature setting corresponds directly to the coldest coil temperature needed at the different zones or buildings.

Since the secondary refrigerated fluid is kept at the lowest possible required temperature during cooling applications, all other higher temperature zones or buildings are maintained by individual thermostats that operate the individual zone pumps located at the distribution center. When a zone needs cooling, the thermostat for that zone signals a small circulation pump at the distribution center.

The distribution center, which is part of the multiplex system, is sized so as to accommodate storage of more than the total solution capacity of the entire system, including all zones. This is of benefit in the event of mechanical failure where flood back of the solution might occur, or during future service. The multiplex system components are usually oversized. By doing this, redundancy is built in for future expansion. The cost of future expansion is greatly reduced as a result.

The system has a wide range of temperature applications, and can be supplied in a flooded condenser model for use in low temperature environments. The entry cost, the maintenance cost, and the operation cost of this equipment is much less because of the starting and stopping of small pumps in lieu of starting and stopping many individual refrigeration units. The air handlers in the system utilize special fin spacing on the coils for added control of humidity and cooling.

THE TRAILER MULTI-SECTION BAY DOOR KIT

In one embodiment, a kit incorporates the use of a hinge or hide-a-way mounted, three section or four section, vertical door assembly (FIG. 5). This door assembly is installed directly behind the original slide up door that covers each individual cargo bay. The purpose of this modification is to maintain the integrity of the refrigerated product inside the truck. Its use keeps the cold, heavy, air inside the bay area, even as the upper door sections are opened during product delivery. It is only necessary to open enough doors to remove the amount of product needed at that location.

The door panels are designed and manufactured in quite the same manner as the insulation panels, except heavier insulation and aluminum sandwich sheeting is used to manufacture these door sections. These door kits are installed in such a manner so as to allow for very sturdy operation. "Lock open" features are built into each door so that each door can lock open or out of the way during loading and unloading. (FIG. 9). This kit is offered with two mounting options. One model is hinge mounted, and the other is a hide-a-way type that slides into a side pocket located inside the cargo area of the truck. A complete retrofit door assembly for each cargo bay opening may be provided, or the door assembly may be originally manufactured. Without the use of the kit, the entire product and refrigerated air inside the cargo bay is exposed to the outside weather condition each time the bay door is raised.

By using the door kit you are still able to use the original slide up door as designed. However, you are now able to keep insulation between the refrigerated product and the weather. With this kit installed, it is only necessary to open enough doors to expose the product you intend to off load at that particular delivery location. As a rule, each bay is loaded from bottom to top with the same product. This product is usually stacked in cardboard flats on top of a wooden pallet. Because several delivery stops are usually made before a bay is totally empty, the use of this kit serves as an insulation barrier between the heavy cold air in a bay and the hot weather outside. These multi section door kits are designed using extruded high quality refrigeration grade insulation board sandwiched between two layers of sheet aluminum. The mounting kit may vary from one trailer to another due to the different trailer dimensions. The standard kit is designed to fit a sixteen bay, eighteen bay, or twenty two bay Hackney model 3RTX trailer, as an example, but kits for many different trucks/trailers are manufactured.

Since it is necessary for a driver to occasionally step up inside the trailer to off load the top loaded flats, a step assembly is included in the kit. This assembly includes a step plate designed to fit each trailer. One left side assembly per truck, and one right side assembly per truck. The step platform is as wide as the bay opening, and locks into place in the door jams. This step platform is moved from one bay to another by simply rotating and sliding along the mounting rail that extends from the front to rear of the trailer bay openings.

In another embodiment, a modification kit is made up of preformed insulation sandwich panels used to insulate trucks that are shipped from the truck manufacturer uninsulated. The panels are preformed to fit the various walls, cavities, floors, and ceilings of the multi chamber truck bodies. These panels are designed and installed so as to best protect the integrity of the refrigerated product stored inside. These panels are made of extruded, high grade, insulation board cut to size. This insulation product is sandwiched between two layers of aluminum sheeting. In some areas "foam in place" insulation is used in addition to the panels.

THE TRUCK COOLING PROCESS

In this process, the multiplex system utilizes either (1) a liquid supply/return line system and heat-exchange, air handling units inside the vehicular storage compartments; or (2) an air trunk line or duct work system that is attached on the supply and return sides of a air handler cooling coil arranged on the outside of the vehicle compartment. (See detail A-B, FIG. 8). In either case, the air handler coil is refrigerated by the same single outdoor condensing unit that cools the other buildings. (See detail AA, FIG. 3). In the latter case, the trunk line supplies cold air to each truck through an arctic air, insulated, flexible, duct system. This duct attaches to each truck by means of heavy duty cam lock connectors, which are normally eight inches in diameter. (See detail B-C, FIG. 9). The supply duct is attached to one end of the truck body, and the return to the opposite end, so that total cross cooling occurs. Each supply duct includes a self contained air booster that increases the air flow and maintains the proper static air differential for best air flow and cooling performance throughout the entire system. (See FIG. 8).

A special humidity removing cooling coil is used to assure the driest possible product cooling. The result is better control of condensation inside the trailer during delivery. This also protects the packing cartons against deterioration due to excess humidity. Dampers and thermostats, used to provide separate cooling control of each trailer, are included. These thermostats and dampers are used when the desired temperature in one truck is higher or lower than in another. The duct kits also include plugs and caps that are used to seal the male and female ends of each cam lock connector when the system is not in use.

This system has been engineered and designed to address a particular problem that exists in the beer manufacturing, storage, and delivery business. However, its application is far reaching. It also addresses a global environmental concern. That concern being the use of fluorocarbon gases for refrigeration purpose. The multiplex system uses up to 85% less fluorocarbon gas than most standard direct expansion systems.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
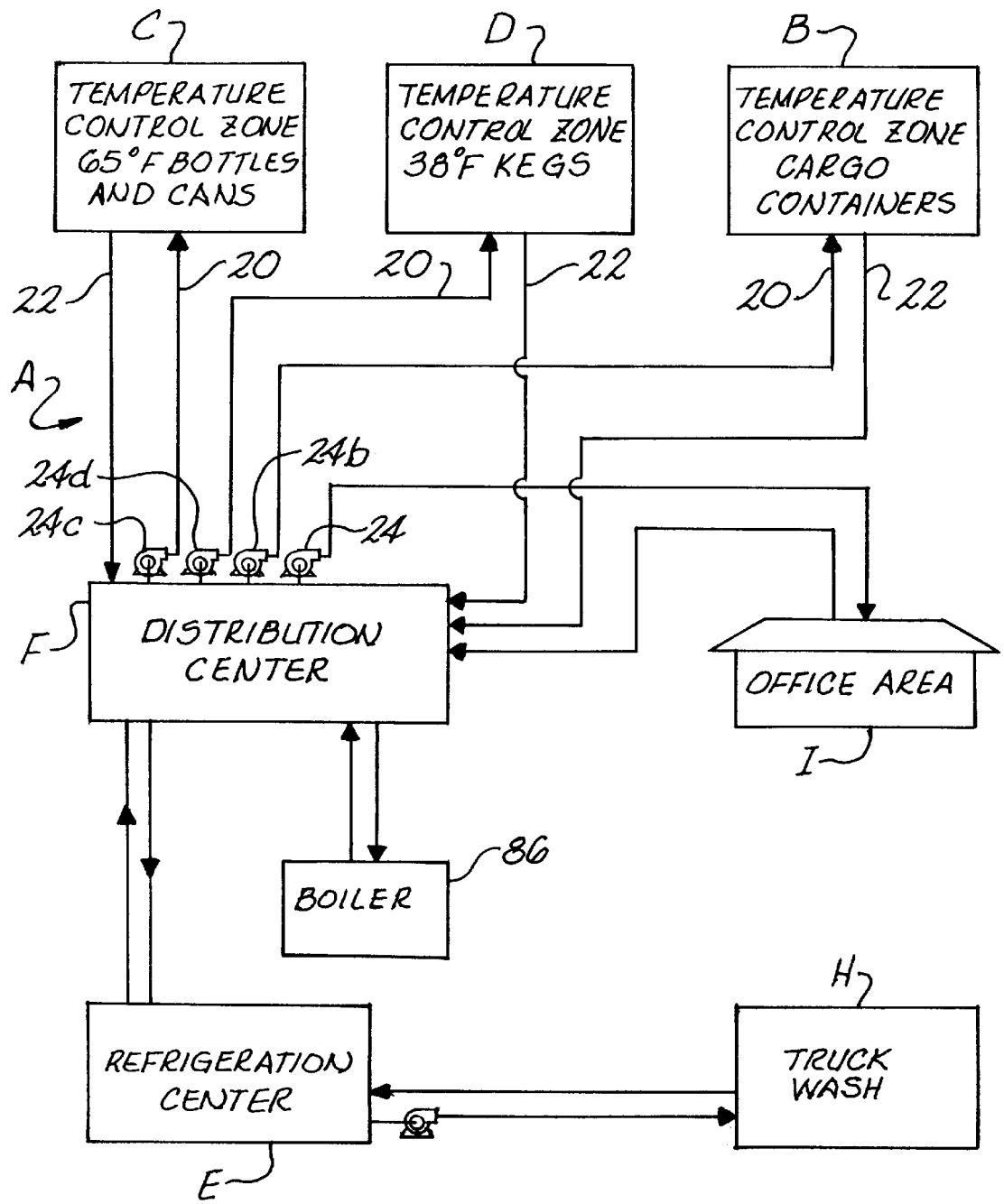
FIG. 1 is a schematic diagram of a multiplex system for maintaining the temperature of a product, in this case beer, in a warehouse and distribution system.
Figure 2:
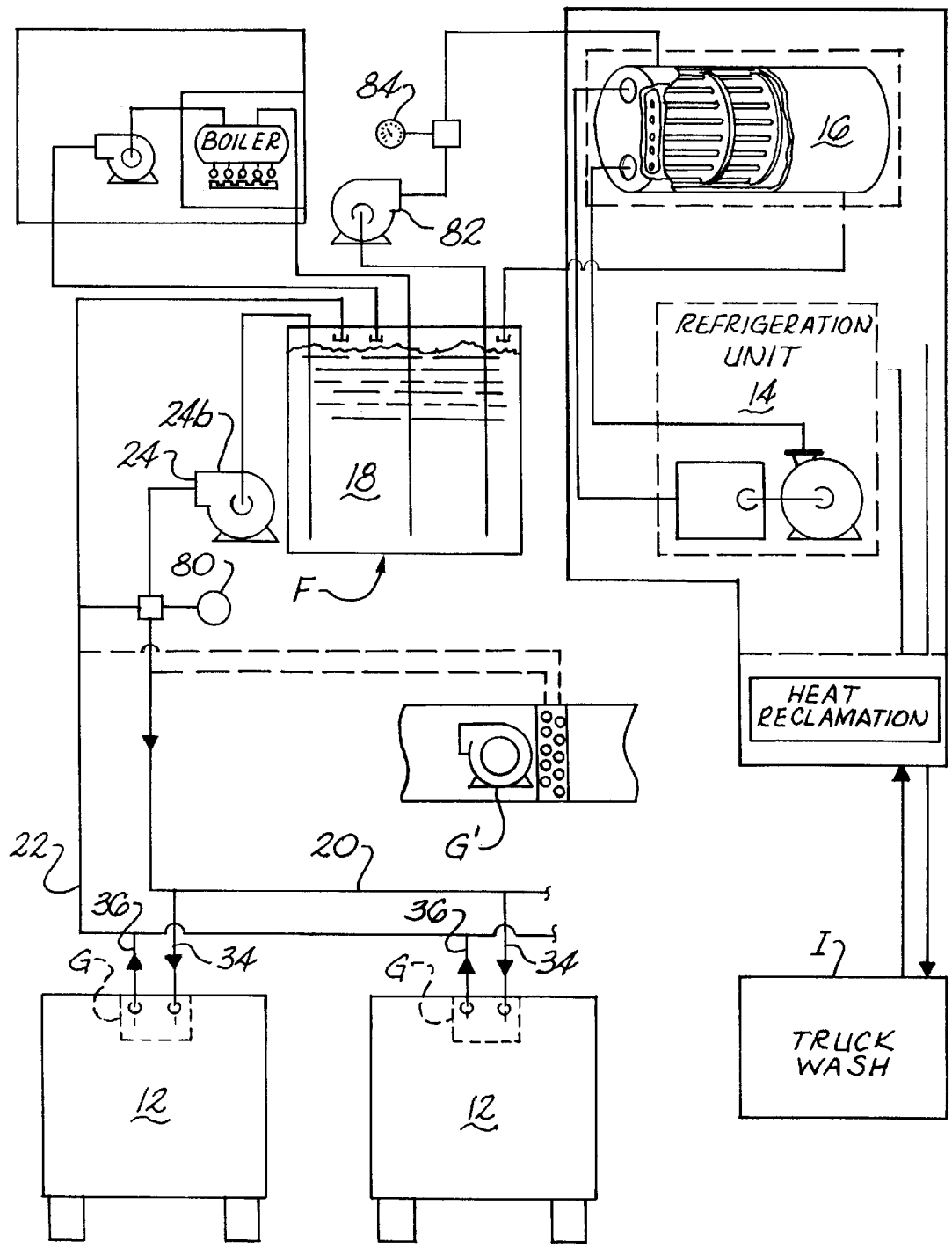
FIG. 2 is a schematic diagram of a system for maintaining the temperature of a product in a cargo container of a delivery vehicle within a multiplex system according to the invention.

Referring now in more detail to the drawings, the invention will now be described in more detail. As can best be seen in FIG. 1, a multiplex system, designated generally as A, is illustrated for maintaining the temperature of beverage or food products at a number of temperature control zones within a warehousing distribution multiplex employing distribution by a vehicle. For example, a beer distribution multiplex system may include a cargo temperature control zone B which includes a parking area, and a plurality of delivery vehicles 10 having cargo containers 12 in which the product is contained for delivery parked at the parking area. There is a bottle and can temperature control zone C which includes a storage area in which beverage bottles and cans are stored at a desired temperature. There may also be a keg temperature D control zone which includes a storage area in which beverage kegs are stored at a desired temperature.

The system includes a refrigeration center E connected in fluid communication to the temperature control zones. Refrigeration center includes a primary refrigeration unit 14 which employs a compressible, primary refrigerant; and a chiller 16 which chills a secondary fluid by means of the primary refrigerant to provide a refrigerated secondary fluid 18. A fluid distribution center F stores the secondary fluid and distributes the secondary fluid to the temperature control zones. A plurality of main supply lines 20 and main return lines 22 is connected in fluid communication between distribution center F and temperature control zones B, C, and D for supplying and returning secondary fluid 18 to the distribution center. There is a pump 24 connected in the main supply lines for each temperature control zone to selectively deliver the secondary fluid to one of the temperature control zones as the need requires to maintain a desired temperature at a corresponding temperature control zone. There is at least one air handling unit, designated generally as G, located at each temperature control zone through which the secondary fluid passes in a heat exchange relationship with air to create a refrigerated air flow 26 which is distributed into cargo container 12 of the vehicle for cooling the product. In one illustrated embodiment of the invention (FIGS. 2–5), air handling unit 6 is actually in the cargo container of each vehicle 10 at the cargo temperature control zone B. In an alternate embodiment (FIGS. 6–8), air handling unit G' may be located at the temperature control zone outside of the cargo containers, both of which embodiments will be disclosed more fully hereinafter.

Figure 3:
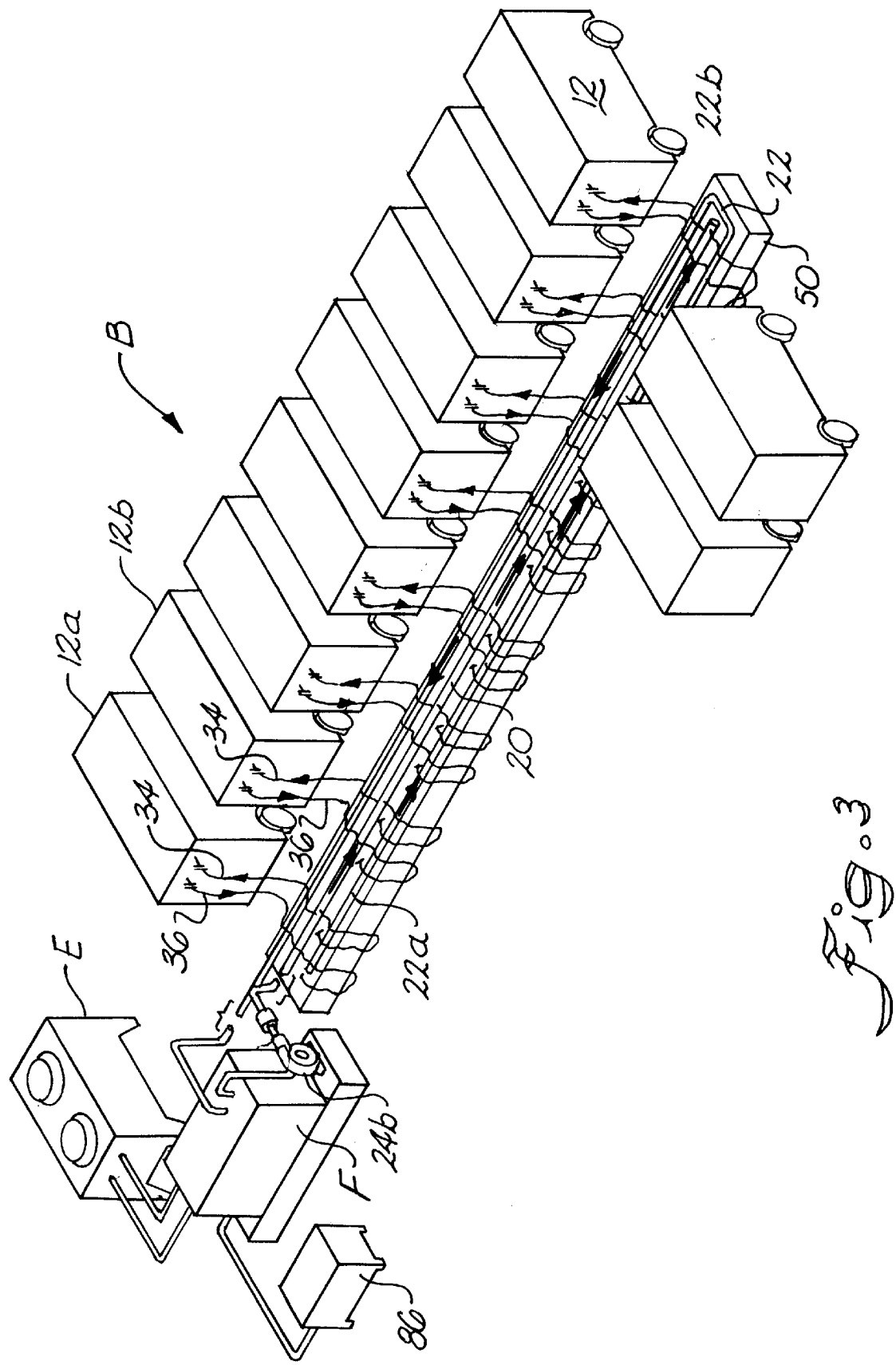
FIG. 3 is a perspective view of a parking area of a vehicle cargo container temperature zone where the temperature of beverage or food product is maintained according to the invention.
Figure 4:
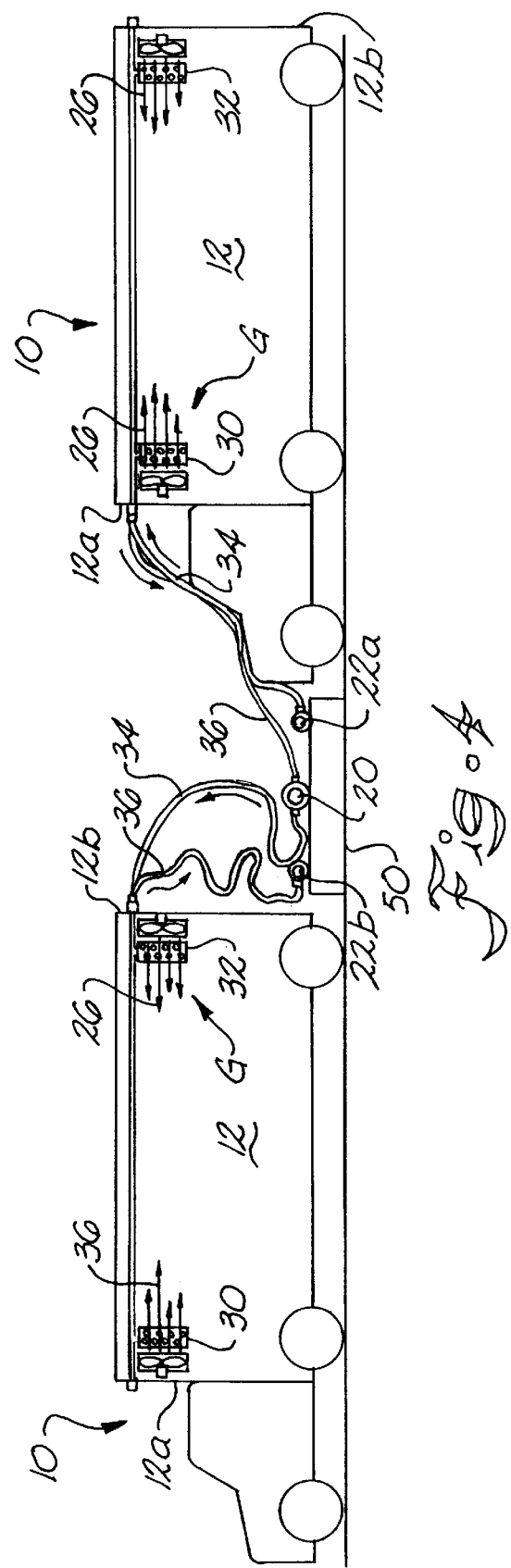
FIG. 4 is a side elevation of a cargo temperature control zone where the temperature of a product is maintained inside the cargo containers of delivery vehicles according to the invention.
Figure 5:
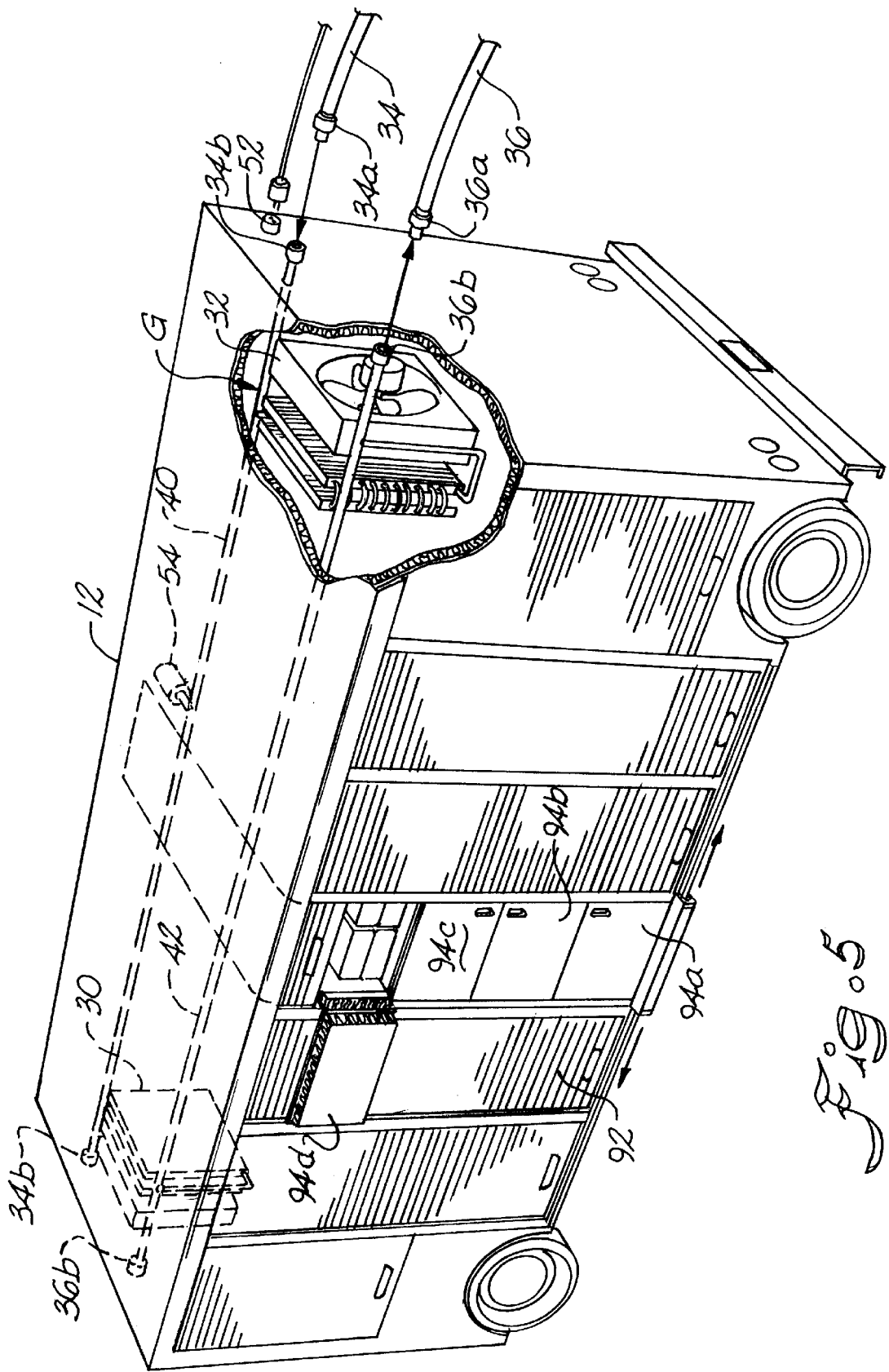
FIG. 5 is a perspective view of a cargo container parked at a cargo temperature control zone where the temperature of product in the container is maintained according to the invention.

As can best be seen in FIGS. 2 through 5, at least one air handling unit G is carried in cargo containers 12, and preferably there is a first air handling unit 30 disposed toward front end 12a of the cargo container and a second air handling unit 32 disposed toward a rear end 126 of the cargo container. There is a plurality of flexible, auxiliary supply lines 34 and return lines 36 connected to the main supply and return lines for delivering the secondary fluid. Auxiliary supply and return lines 34, 36 are adapted for fluid communication with air handling units 30, 32 in the cargo containers of delivery vehicles 10 at cargo temperature control zone B by means of releasable fluid couplings 34a, 36a carried by the auxiliary supply return lines for releasably connecting the auxiliary supply and return lines directly to the cargo container of the delivery vehicles (FIG. 5). Interior supply and return conduits 40, 42 are carried within the cargo containers for connecting the air handling unit with the auxiliary supply and return lines so that air handling units 30, 32 receive the secondary fluid in a heat exchange relationship to create a refrigerated air flow 26 inside the cargo container for cooling the products. It is noted that air handling units 30, 32 are coil-type units which allow the flow of refrigerated fluid in opposite directions.

Most important, referring to FIG. 3, it is noted that the main return line 22 includes a reverse-return line which has a first return leg 22a and a second return leg 22b, and that secondary fluid passes 18 in a direction reverse through the second return leg relative to the first return leg. Auxiliary return lines 36 are connected to the reverse-return line in a manner that the secondary fluid supplied via 34 to a first cargo container 12a is returned via 36 to first return leg 22a at a point closest to a remote end of the first leg, fluid supplied via 34 to a second cargo container 126 is returned via 36 to return leg 22b second to last, and the secondary fluid is progressively returned on a first-in\last-out basis from cargo containers 12 of the delivery vehicles connected to the auxiliary supply and return lines. This pattern is successively repeated for each container. This provides the important advantage of even refrigerated fluid flow, pressure, and temperature throughout the cargo control zone and multiplex system. This enables the flow, temperature and pressure at each container to be equalized.

As can best be seen in FIGS. 4 and 5, an island 50 is located at parking area 52 of cargo temperature control zone B. The main supply and return lines are arranged at the island in a manner that cargo containers 12 may be parked with front end 12a or rear end 12b of the cargo container parked facing the island. For this purpose, fluid supply and return ports 34b, 36b are carried by cargo containers 12 in fluid communication with the interior conduits 40, 42. The fluid couplings of the auxiliary supply and return lines are connectable to the supply and return ports for delivering the secondary fluid to the air handling unit. Cargo containers 12 include a pair of supply and return ports 34b, 36b on the front and rear ends of the cargo container so that the auxiliary supply and return lines may be connected to either one of the front and rear ends at the island (FIG. 5). Interior conduit is constructed and arranged so that secondary fluid supplied and returned from either of the front end or rear end supply and return parts passed through each of the first and second air handling units.

A quick connect/disconnect power source coupling 52 may be provided at the same location of the return supply couplings for powering the air handling units. The air handling units are of the type having spaced coil fins which allow the unit not only to be a cooling coil but a dehumidifying coil or unit. This is important in preserving the integrity of the cardboard packing cartons which the product may be packaged in as stored in the delivery compartment. The air handling units are housed in stainless steal housings to protect them from a caustic environment, and salty air in coastal environments. A special welding alloy may also be utilized in the air handling units to protect against these adverse conditions. A suitable air handling unit is available from Technical Systems of Pryor, Okla. Suitable fluid and air coupling are available from the Aeroquip Company known as Cam-Loc coupling. It is noted that fluid supply and return ports 34b, 36b are self-closing when couplings 34a, 36a are disconnected so that secondary fluid remains inside the container. An emergency expansion tank 54 is provided with each air handling unit to provide for an emergency situation in which the cargo container encounters high temperatures. This could produce hydraulic expansion of the secondary fluid and a system rupture could occur if there was no emergency expansion tank.

Figure 6:
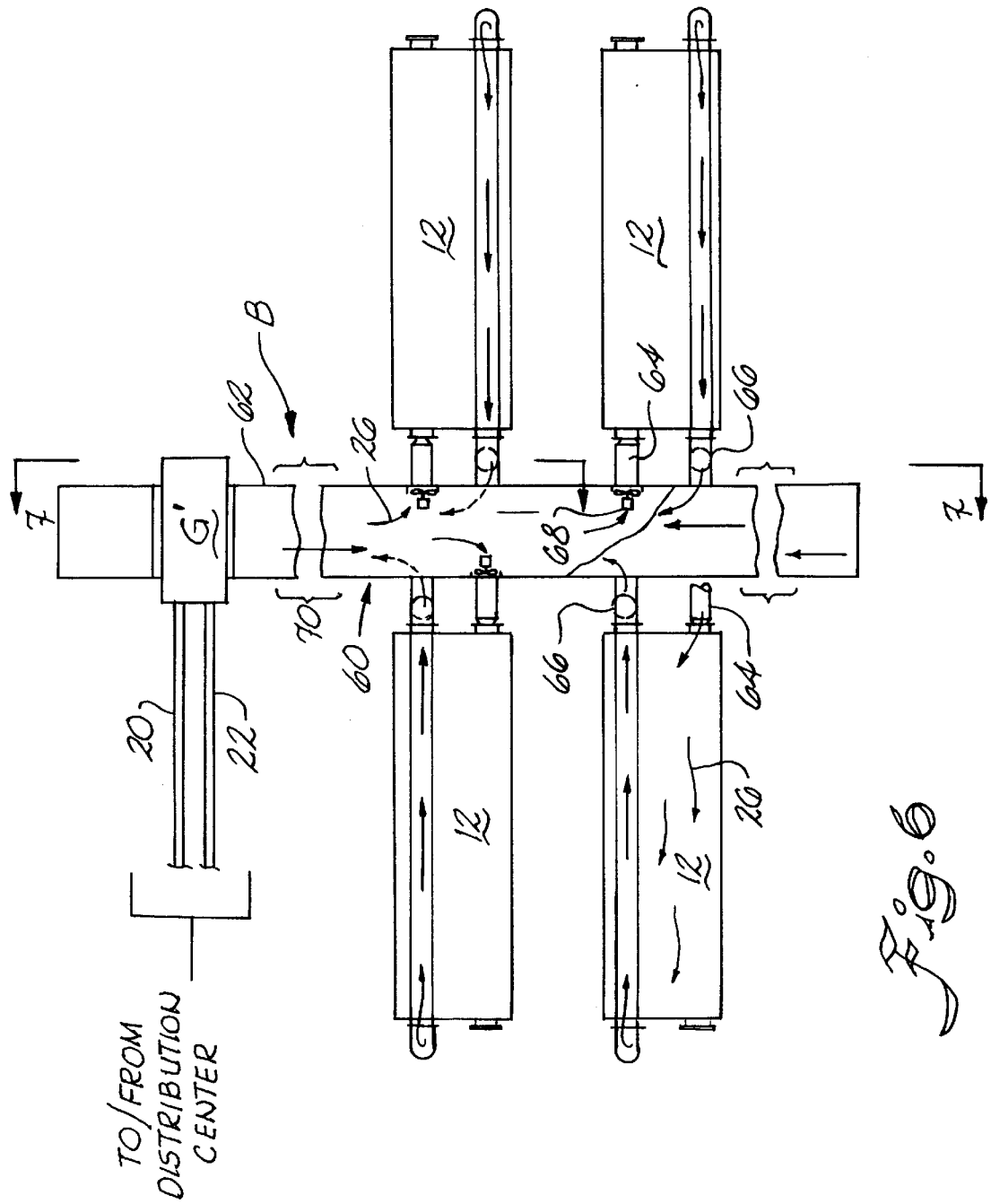
FIG. 6 is a top plan view of an alternate embodiment of a cargo temperature control zone where the temperature of product contained in cargo containers is maintained according to the invention by using an outside air handling unit.
Figure 7:
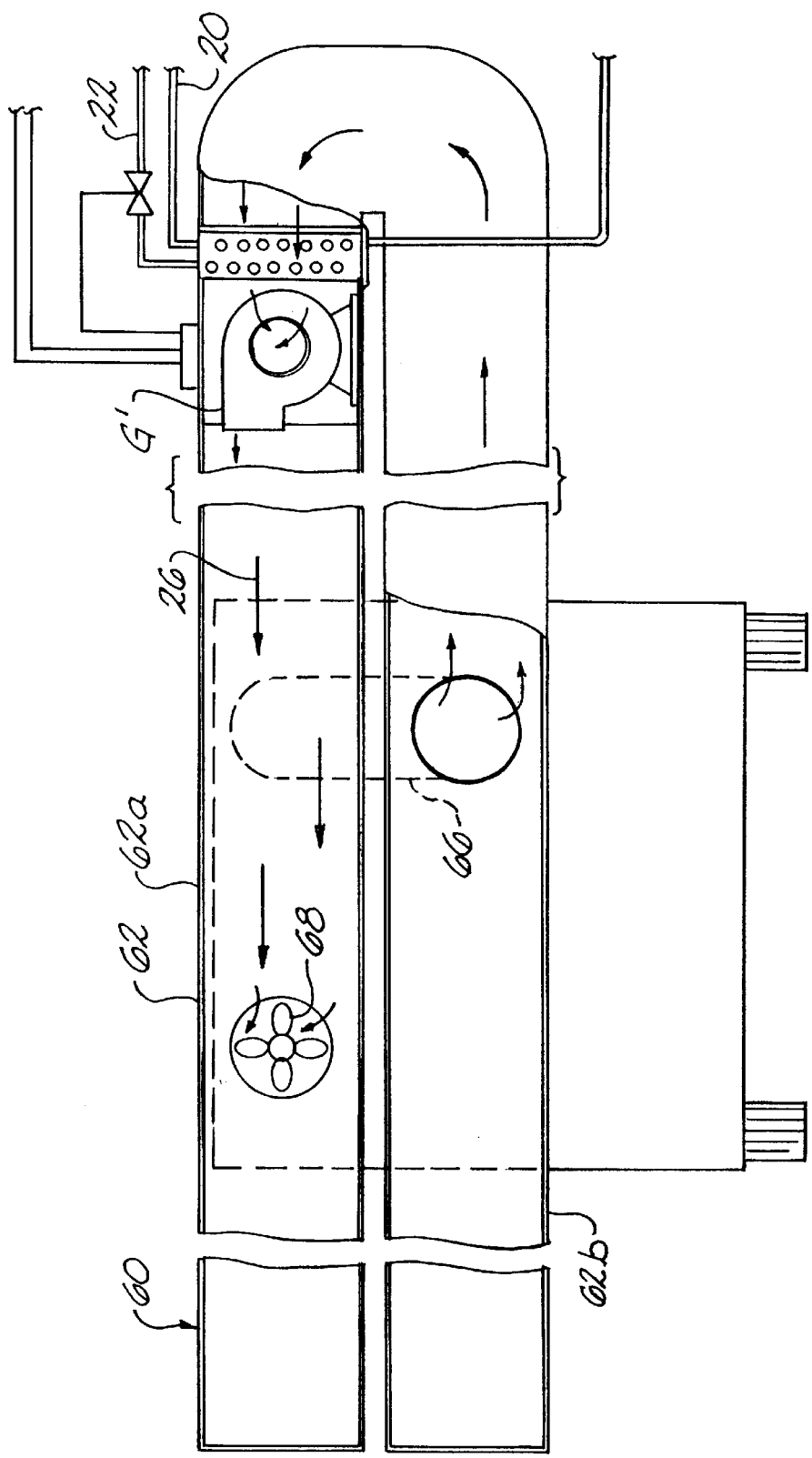
FIG. 7 is a sectional view taken through line 7—7 of FIG. 6.
Figure 8:
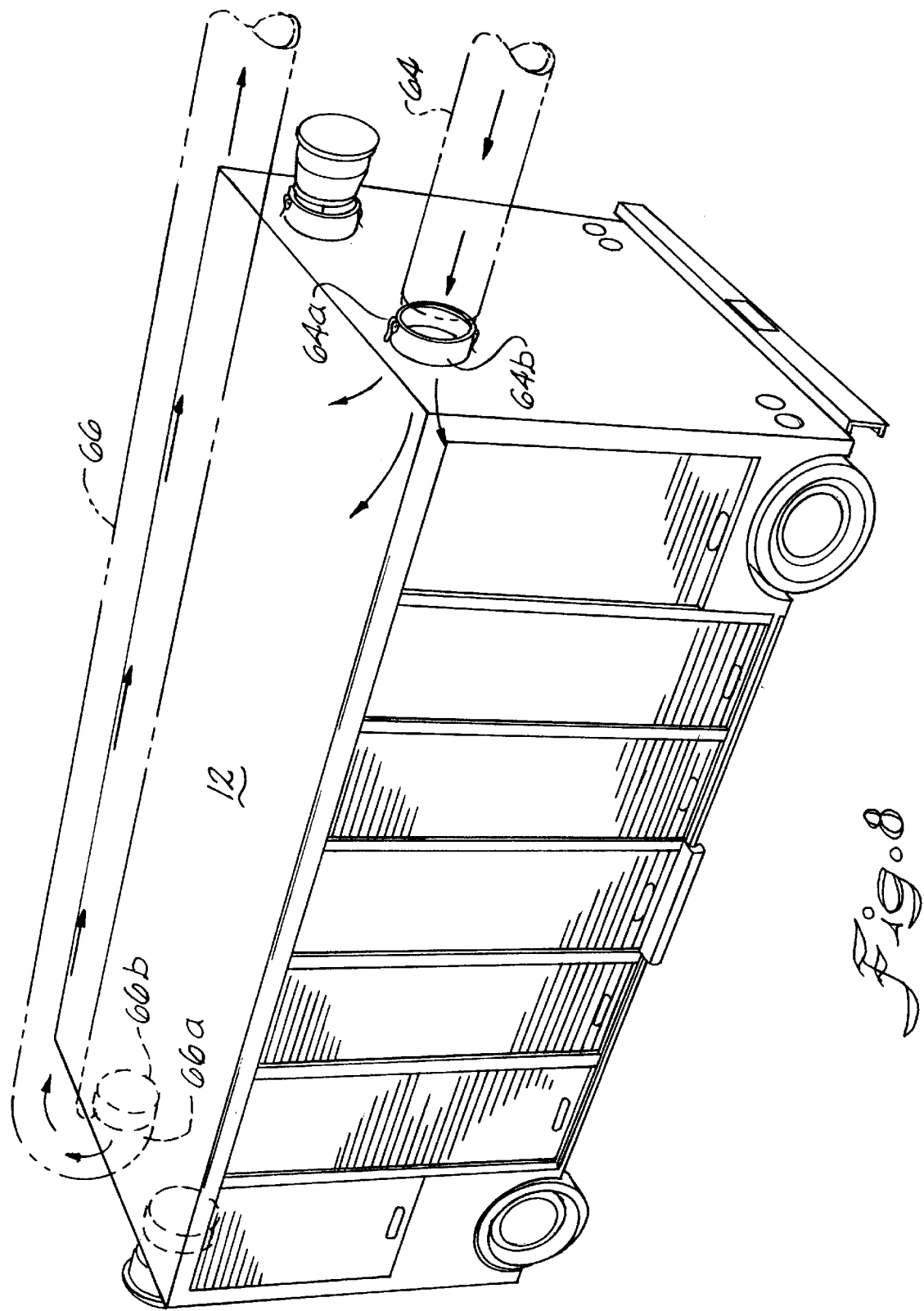
FIG. 8 is a perspective view of a cargo container parked at a cargo temperature control zone where the temperature of a product is maintained according to the invention.

An alternate embodiment of the invention is illustrated in FIGS. 6 through 8 wherein an air handling unit G' is located outside of cargo containers 12 of parked vehicles 10 at the cargo temperature control zone B. In this case, an air duct system, designated generally as 60, is arranged to receive refrigerated air flow 26 from the air handling unit and distribute the refrigerated air flow into one the cargo containers of one or more of the delivery vehicles. As illustrated, air duct system 60 comprises a manifold 62 in fluid communication with air handling unit G' for supplying and returning the air flow. A plurality of flexible air supply ducts 64 is connected to the manifold for delivering the refrigerated air flow to the cargo containers. A plurality of flexible air return ducts 66 is connected to the manifold for returning air from the cargo containers. Quick release air couplings 64a, 66a are carried by the supply and return ducts for releasably attaching supply and return ducts 64, 66 to cargo containers 12. Booster fans 68 are disposed in an air flow communication with the flexible supply and return ducts for assisting in the distribution of refrigerated air flow 26 into the cargo containers. Manifold 62 extends between spaced parallel rows of the cargo containers in the form of an island 70 so that the refrigerated air flow may be delivered to one or both of the rows. Each cargo container includes a supply port 64b and a return port 66b which are respectively connectable to the flexible supply and return ducts by means of quick release couplings 64a, 66a (FIG. 8). Supply ports 64b and return ports 66b are located on opposite ends of the cargo containers 12. Preferably, there are a pair of supply and return ports carried by each cargo container so that the air ducts may be connected to either end of the cargo container depending on how the vehicle is parked.

Bottle and can temperature control zone C includes at least one air handling unit G' (not shown) located within the storage facility housing the cans and bottles in fluid communication with the fluid distribution center. The air handling unit creates a refrigerated air flow cooling the bottles and cans; and a bottle and container zone pump 24c delivers the secondary fluid from the distribution center as needed to maintain the desired temperature.

Keg temperature control zone D includes a storage area in which beverage kegs are stored at a desired temperature; and at least one air handling unit G' (not shown) located at the keg temperature control zone in fluid communication with the distribution center. The air handling unit creates a refrigerated air flow for cooling the kegs; and keg zone pump 24d delivers the secondary fluid from the distribution center as needed to maintain the desired temperature.

A conventional temperature controller 80 is provided for selectively operating one of the plurality of pumps 24b, 24c, 24d for delivering the secondary fluid to one or more temperature control zones in order to maintain a desired temperature at the temperature control zone, as sensed at the zone. There is a main pump 82 for circulating the secondary fluid in heat exchange relationship with the primary refrigerant; and a conventional, main temperature controller 84 for selectively operating the main pump. The main pump is operated so that the secondary fluid at the distribution center is maintained at the lowest temperature necessary to satisfy the conditions at the temperature control zone. The control zone pumps may then be cut off and on to maintain the desired control zone temperature.

A heat source may be connected to the distribution center for heating the secondary fluid in the event that the product needs to be heated rather than cooled in order to maintain the product temperature. A hot water reclamation unit may be connected to the refrigeration unit for recovering heat from the primary refrigeration unit; and means may be provided for connecting the hot water reclamation unit with a heating system of a building enclosure for heating the building enclosure.

Refrigeration system 14 may be any suitable standard expansion refrigeration unit which includes a sealed, closedloop refrigeration system employing a primary, compressible refrigerant such as a fluorocarbon and the like. Distribution center F employs a secondary, non-compressible refrigerant which is preferably an antifreeze solution such as an propylene glycol/water solution 18 contained in reservoir 18a. A suitable refrigeration/chiller system is available from Century Engineering of Pryor, Okla. While cooling has been described, it is to be understood that the secondary fluid may be heated, rather than refrigerated by an auxiliary heating source, to warm the product and prevent its freezing in some applications.

For this purpose, a mini boiler or other heat source may be provided at 86 for heating the secondary fluid 60 stored in distribution center 58. The product temperature control process remains the same. The mini boiler may be any conventional gas, oil, or electric operated apparatus.

Using a hot water reclamation system, hot water may be supplied from refrigeration center E to a truck wash zone H (FIG. 1), and/or to office space for heating, etc. Finally, in the illustrated embodiment, air conditioning and heating may be supplied from the distribution center F to an office zone I. Thus, in the illustrated embodiment of the invention, a multiplex system is utilized wherein a suitable non-fluorocarbon, refrigerated fluid is supplied to a number of zones for cooling and/or heating. The entire refrigeration system may be controlled thermostatically in an conventional manner. Since thermostatic controls are well known in the art, reference and disclosure of such is made only as it necessary to an understanding of the present invention.

Figure 9:
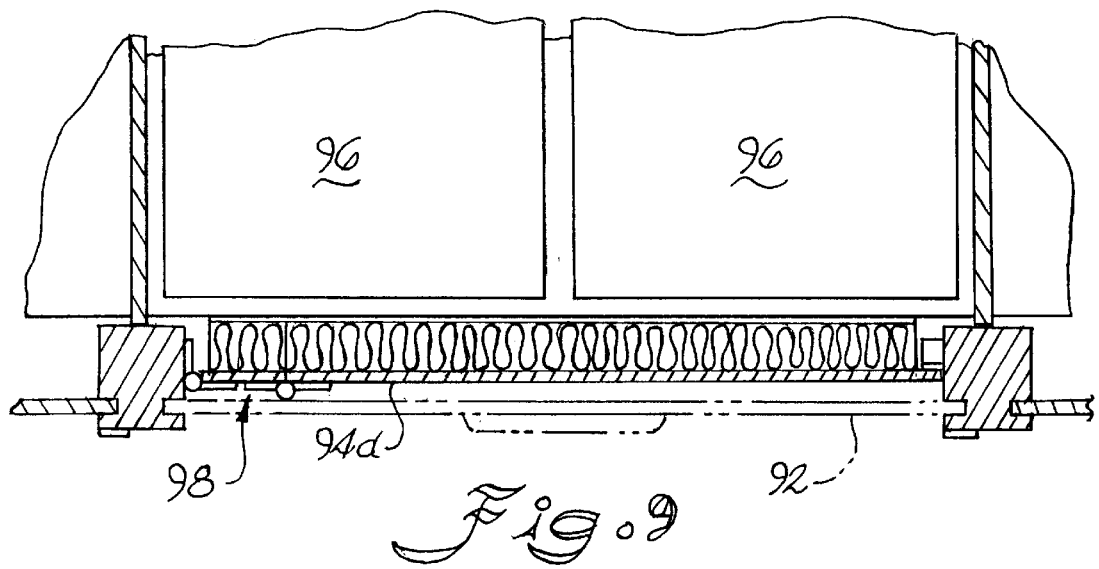
FIG. 9 is a top plan sectional view of a cargo bay of a cargo container illustrating insulated compartment doors for maintaining the temperature of product inside the container according to the invention during delivery.
Figure 10:
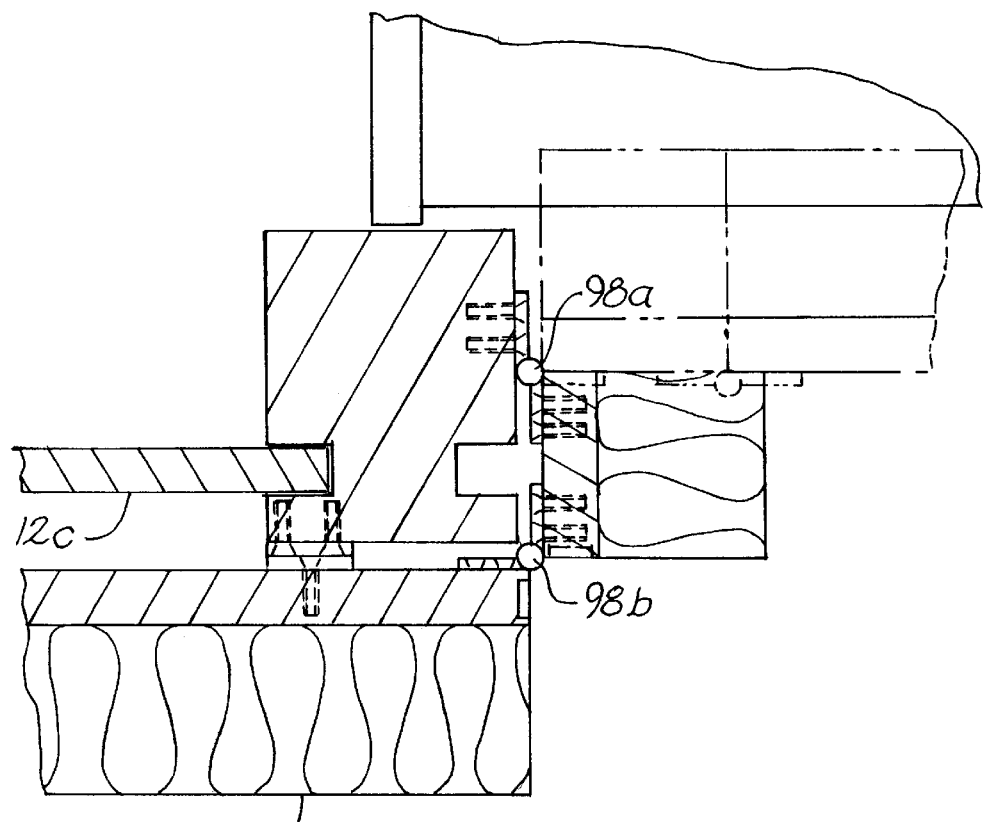
FIG. 10 is a top plan sectional view of a cargo bay door of FIG. 9 in an open position.

As can best be seen at FIG. 9, two options for kits modifying cargo compartments 12 are illustrated so as to enhance the refrigeration capabilities of the vehicle. First, insulation may be added by providing panels (not shown) of insulation to the interior walls of the cargo container. Next, the doors of cargo bays 90 of the conventional delivery vehicle which are normally closed by a single vertically sliding door 92 are provided with multiple vertically stacked doors 94, e.g. 94a–94d, so that the doors may be open to remove an upper case or product stack 96 without opening the remaining doors and thus maintain the cooling inside the cargo bay (FIG. 5). For this purpose, a door 94 is provided with a double hinge 98, one part at 98a and a second part at 98b, so that the door may be opened outwardly to the outside wall 12c of the contain (FIG. 10).

While a preferred embodiment of the invention has been described using specific terms, such description is for illustrative purposes only, and it is to be understood that changes and variations may be made without departing from the spirit or scope of the following claims.

What is claimed is:

1. A system for maintaining the temperature of food and beverage products located at a warehouse distribution complex comprising:
    a plurality of remote temperature control zones located within the warehouse distribution complex;
    a refrigeration center connected in fluid communication to said temperature control zones;
    said refrigeration center including a primary refrigeration unit which employs a compressible, primary refrigerant;
    a source of a secondary fluid which is chilled by said primary refrigerant to provide a refrigerated secondary fluid;
    a fluid distribution center for storing said secondary fluid and distributing said secondary fluid to said temperature control zones;
    a plurality of main supply lines and main return lines connected in fluid communication between said distribution center and said temperature control zones for supplying and returning said secondary fluid to said distribution center;
    a plurality of pumps connected in said main supply lines for selectively delivering said secondary fluid to one of said temperature control zones as the need requires to maintain a desired temperature at a corresponding temperature control zone;
    a cargo temperature control zone included in said plurality of temperature control zones which includes a parking area; a plurality of delivery vehicles having cargo containers in which said product is contained for delivery parked at said parking area; and
    at least one air handling unit located at said cargo temperature control zone through which said secondary fluid passes in a heat exchange relationship with air to create a refrigerated air flow which is distributed into said cargo container of said vehicle for cooling said product.

2. The system of claim 1 including an air duct system arranged to receive said refrigerated air flow from said air handling unit and distribute said refrigerated air flow into one said cargo containers of one or more of said delivery vehicles.

3. The system of claim 1 wherein said air duct system comprises a manifold in fluid communication with said air handling unit for supplying and returning said air flow;
    a plurality of flexible air supply ducts connected to said manifold for delivering said refrigerated air flow to said cargo containers; and
    a plurality of flexible air return ducts connected to said manifold for returning air from said cargo containers; and
    quick release air couplings carried by said supply and return ducts for releasably attaching said supply and return ducts to said cargo containers.

4. The system of claim 3 including booster fans disposed in an air flow communication with said flexible supply and return ducts for assisting in the distribution of said refrigerated air flow into said cargo containers.

5. The system of claim 3 wherein said manifold extends between spaced parallel rows of said cargo containers in the form of an island so that said refrigerated air flow may be delivered to one or both of said rows.

6. The system of claim 3 wherein said cargo container each include a supply port and a return port which are respectively connectable to said flexible supply and return ducts by means of said quick release couplings.

7. The system of claim 4 wherein said supply and return ports are located on opposite ends of said cargo containers.

8. The system of claim 7 including a pair of said supply and return ports carried by said cargo container so that said cargo container may be connected to either end of said cargo container.

9. The system of claim 1 wherein a bottle and can temperature control zone is included in said plurality of temperature control zones which includes a storage area in which beverage bottles and cans are stored at a desired temperature;
    at least one air handling unit located at said bottle and can temperature control zone in fluid communication with said fluid distribution unit; and
    said air handling unit creating a refrigerated air flow cooling said bottles and cans; and a bottle and container zone pump included in said plurality of pumps for delivering said secondary fluid from said distribution center as needed to maintain said desired temperature.

10. The system of claim 1 wherein a keg temperature control zone is included in said plurality of temperature control zones which includes a storage area in which beverage kegs are stored at a desired temperature;

at least one air handling unit located at said keg temperature control zone in fluid communication with said distribution center; and said air handling unit creating a refrigerated air flow for cooling said kegs; and a keg zone pump included in said plurality of pumps for delivering said secondary fluid from said distribution center as needed to maintain said desired temperature.

11. The system of claim 1 including a heat source connected to said distribution center for heating said secondary fluid in the event that said product needs to be heated rather than cooled in order to maintain said product temperature.

12. The system of claim 1 including a hot water reclamation unit connected to said refrigeration unit for recovering heat from said primary refrigeration unit; and means connecting said hot water reclamation unit with a heating system of a building enclosure for heating said building enclosure.

13. The system of claim 1 including a temperature controller for selectively operating one of said plurality of pumps, including a cargo pump for delivering said secondary fluid to said cargo temperature control zone, to maintain said desired temperature at said temperature control zone.

14. The system of claim 1 including a main pump for circulating said second fluid in said heat exchange relationship with said primary refrigerant; and a main temperature controller for selectively operating said main pump so that said secondary fluid at said distribution center is maintained at the lowest temperature necessary to satisfy said temperature control zone.

15. The system of claim 1 wherein at least one air handling unit includes at least one air handling unit carried inside said cargo containers, and including:

a plurality of flexible, auxiliary supply and return lines connected to said main supply and return lines for delivering said secondary fluid, said auxiliary supply and return lines adapted for fluid communication with said air handling unit in said cargo containers of said delivery vehicles at said cargo temperature control zones; and fluid coupling carried by said auxiliary supply return lines for releasably connecting said auxiliary supply return lines directly to said cargo container of said delivery vehicles.

16. The system of claim 15 including interior conduits carried within said cargo containers connecting said air handling unit with said auxiliary supply and return lines so that said air handling unit receives said secondary fluid in a heat exchange relationship to create a refrigerated air flow inside said cargo container for cooling said products.

17. The system of claim 15 wherein said main return line includes a reverse-return line which has a first return leg and a second return leg, and said secondary fluid passes in a direction reverse through said second return leg relative to said first return leg; and said auxiliary return lines are connected to said reverse-return line in a manner that the secondary fluid which enters a first cargo container is returned to said first return leg at a point closest to a remote end of said first leg, and said secondary fluid is progressively returned on a first-in\last-out basis from said cargo containers of said delivery vehicles which are connected to said auxiliary supply and return lines.

18. The system of claim 17 including:

an island located at said parking area of said cargo temperature control zone, said main supply and return lines being arranged at said island in a manner that said cargo containers may be parked with a front end or a rear end of said cargo container parked facing said island; and fluid supply and return parts carried by said cargo containers in fluid communication with said interior conduits; and said fluid couplings of said auxiliary supply and return lines being connectable to said supply and return parts for delivering said secondary fluid to said air handling unit.

19. The system of claim 18 wherein said cargo container includes said pair of said supply and return parts on said front and rear ends of said cargo container so that said auxiliary supply and return lines may be connected to either one of said front and rear ends at said island.

20. The system of claim 19 wherein said cargo trailer includes at least a first air handling unit and a second air handling unit disposed in a spaced apart relation in said cargo container; and said interior conduit being constructed and arranged so that secondary fluid supplied and returned from either of said front end or rear end supply and return parts passed through each of said first and second air handling units.

21. The system of claim 20 wherein said first air handling unit is disposed toward said front end of said cargo container and said second air handling unit is disposed toward said rear end of said cargo container.

22. The system of claim 15 including an expansion tank carried in said cargo container connected in fluid communication with said secondary fluid flowing through said air handling unit to receive said secondary fluid in the event of hydraulic expansion under high inside temperatures.

23. The system of claim 1 wherein said cargo containers include a plurality of bays for accommodating a plurality of vertical stacks of said product; and wherein each said bay includes a series of vertically arranged doors corresponding to said stacks of product so that one door may be opened to remove product without exposing the remaining product to the ambient environment.

24. The system of claim 23 including a vertical sliding door carried by said cargo container which reciprocates to cover and uncover said series of doors.

25. The system of claim 23 including a horizontally sliding step carried by said cargo container to be selectively positioned at a bay for removal of product from said vertical stacks.

26. A system for maintaining the temperature of a food or beverage product in delivery vehicles during a storage and delivery process comprising;

a primary refrigeration unit having a primary refrigerant;

a secondary refrigeration unit having a non-compressible, secondary fluid;

a heat exchanger in which said secondary fluid is passed in heat exchange relation with said primary refrigerant for cooling of said secondary fluid;

a remote cargo temperature control zone located at a geographic location remote from said primary refrigeration unit, and said delivery vehicles being parked at said remote cargo temperature control zone;

a distribution center disposed in fluid communication with said secondary refrigeration unit for receiving said secondary fluid and distributing said secondary fluid to said cargo temperature control zone;

a main supply line and a main return line connecting said distribution center and said cargo temperature control zone through which said secondary refrigerant is distributed to said cargo temperature control zone;

a plurality of auxiliary supply and return lines connected to said main supply and return lines for connection to cargo containers of said delivery vehicles at said container temperature control area; and fluid couplings carried by said auxiliary supply and return lines for releasably connecting said auxiliary supply and return line to said cargo containers of said delivery vehicles;

at least one delivery vehicle having a cargo container in which said product is contained, and said cargo container having a fluid supply port and a return port connectable to said fluid couplings of said auxiliary supply and return lines; and at least one air handling unit permanently carried within said cargo container of each said delivery vehicle, said air handling unit being connected in fluid communication with said fluid supply and return ports for receiving said secondary fluid to create a refrigerated air flow inside said cargo container for maintenance of said product temperature.

27. The system of claim 26 wherein said secondary fluid comprises an antifreeze solution in a form of a non-compressible fluid.

28. The system of claim 26 including:

a plurality of said delivery vehicles having trailer cargo containers in which said products are contained; and at least a first and a second air handling unit carried in said cargo container of said vehicles which receives said secondary fluid for creation of said refrigerated air flow within said cargo compartment.

29. The system of claim 26 wherein said air handling unit includes a blower and a coil, said secondary fluid being circulated in said coil as said blower blows air over said coil for creation of said refrigerated air flow in said cargo container to maintain said product temperature.

30. The system of claim 26 wherein said main return line includes a reverse-return line which has a first return leg and a second return leg, and said secondary fluid passes in a direction reverse through said second return leg relative to said first return leg; and said auxiliary return lines are connected to said reverse-return line in a manner that the secondary fluid which enters a first cargo container is returned to said first return leg at a point closest to a remote end of said first leg, and said secondary fluid is progressively returned on a first-in\last-out basis from said cargo containers of said delivery vehicles which are connected to said auxiliary supply and return lines.

31. The system of claim 30 including:

an island located at said parking area of said cargo temperature control zone, said main supply and return lines being arranged at said island in a manner that said cargo containers may be parked with a front end or a rear end of said cargo container parked facing said island; and fluid supply and return parts carried by said cargo containers in fluid communication with said interior conduits; and said fluid couplings of said auxiliary supply and return lines being connectable to said supply and return parts for delivering said secondary fluid to said air handling unit.

32. The system of claim 26 wherein said cargo container includes said pair of said supply and return ports on said front and rear ends of said cargo container so that said auxiliary supply and return lines may be connected to either one of said front and rear ends at said island.

33. The system of claim 32 wherein said cargo trailer includes at least a first air handling unit and a second air handling unit disposed in a spaced apart relation in said cargo container; and said interior conduit being constructed and arranged so that secondary fluid supplied and returned from either of said front end or rear end supply and return parts passed through each of said first and second air handling units.

34. The system of claim 33 wherein said first air handling unit is disposed toward said front end of said cargo container and said second air handling unit is disposed toward said rear end of said cargo container.

35. The system of claim 26 wherein including a heat source for heating said secondary fluid in the event said product needs heating rather than cooling to maintain said desired product temperature.

36. The system of claim 26 including an expansion tank carried in said cargo container connected in fluid communication with said secondary fluid flowing through said air handling unit to receive said secondary fluid in the event of hydraulic expansion under high inside temperatures.

37. A system for maintaining the temperature of food and beverage products in delivery vehicles during the storage and delivery process comprising;

a primary refrigeration unit having a primary refrigerant;

a secondary refrigeration unit having a non-compressible, secondary fluid;

a heat exchanger in which said secondary fluid is passed in heat exchange relation with said primary refrigerant for cooling of said secondary fluid;

a distribution center containing said secondary fluid, and a main supply line and return line for distributing said secondary fluid to said cargo temperature control zone;

at least one air handling unit located at said cargo temperature control zone through which said secondary fluid passes in heat exchange relation with air;

said air handling unit creating a refrigerated air which is distributed into a cargo container of said vehicle for cooling said product; and an air duct system arranged at said vehicle temperature control zone in flow communication with said air handling unit having supply ducts for delivering cooled air to the storage compartments of the delivery vehicles and return ducts for returning air to said air handling unit;

said air duct system comprising a manifold connected to said air handling unit for supplying and returning said air flow;

a plurality of flexible air supply ducts connected to said manifold for delivering said refrigerated air flow to said cargo containers;

a plurality of flexible air return ducts connected to said manifold for returning air from said cargo containers; and quick release air couplings carried by said supply and return ducts for releasably attaching said supply and return ducts to said cargo containers.

38. The system of claim 37 including booster fans disposed in an air flow communication with said flexible supply and return ducts for assisting in the distribution of said refrigerated air flow into said cargo containers.

39. The system of claim 37 wherein said manifold extends between spaced parallel rows of said cargo containers in the form of an island so that said refrigerated air flow may be delivered to one or both of said rows.

40. The system of claim 37 wherein said cargo container each include a supply port and a return port which are respectively connectable to said flexible supply and return ducts by means of said quick release couplings.

41. The system of claim 40 wherein said supply and return ports are located on opposite ends of said cargo containers.

42. The system of claim 41 including a pair of said supply and return ports carried by said cargo container so that said cargo container may be connected to either end of said cargo container.

43. A system for maintaining the temperature of food and beverage products in delivery vehicles during the storage and delivery process comprising;

a primary refrigeration unit having a primary refrigerant;

a secondary refrigeration unit having a non-compressible, secondary fluid;

a heat exchanger in which said secondary fluid is passed in heat exchange relation with said primary refrigerant for cooling of said secondary fluid;

a remote cargo temperature control zone located at a location remote from said primary refrigeration unit, and said delivery vehicles being parked at said remote cargo temperature control zone;

a distribution center containing said secondary fluid, and a main supply line and return line for distributing said secondary fluid to said cargo temperature control zone;

at least one air handling unit located at said cargo temperature control zone through which said secondary fluid passes in heat exchange relation with air;

said air handling unit creating a refrigerated air which is distributed into a cargo container of said vehicle for cooling said product; and an air duct system arranged at said cargo temperature control zone in flow communication with said air handling unit having flexible supply ducts for delivering cooled air to the storage compartments of the delivery vehicles and flexible return ducts for returning air to said air handling unit; and said cargo containers each include a supply port and a return port which are respectively connectable to said flexible supply and return ducts.

44. The system of claim 43 wherein said supply and return ports are located on opposite ends of said cargo containers.

45. The system of claim 44 including a pair of said supply and return ports carried by said cargo container so that said supply and return ducts may be connected to either end of said cargo container.

* * * * *